(12) United States Patent
Tonkin et al.

(10) Patent No.: US 10,221,817 B2
(45) Date of Patent: Mar. 5, 2019

(54) INTAKE AIR HEATING SYSTEM FOR A VEHICLE

(71) Applicant: Phillips & Temro Industries Inc., Eden Prairie, MN (US)

(72) Inventors: Steven W. Tonkin, Eden Prairie, MN (US); Jeremy N. Douglas, Chanhassen, MN (US); Roger J. Halberg, Savage, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 15/628,974

(22) Filed: Jun. 21, 2017

(65) Prior Publication Data

US 2017/0342948 A1    Nov. 30, 2017

Related U.S. Application Data

(63) Continuation-in-part of application No. 15/166,009, filed on May 26, 2016.

(51) Int. Cl.
*F02M 31/13* (2006.01)

(52) U.S. Cl.
CPC .................. *F02M 31/13* (2013.01)

(58) Field of Classification Search
CPC ............. F02M 31/13; F02M 35/10249; F02M 35/10268; H05B 1/0202
See application file for complete search history.

(56) References Cited

U.S. PATENT DOCUMENTS

| 3,851,278 A | 11/1974 | Isono |
| 3,934,567 A | 1/1976 | Fujieda et al. |
| 4,034,204 A | 7/1977 | Windsor et al. |
| 4,669,306 A * | 6/1987 | Akiyama .............. G01F 1/6986 73/114.34 |

(Continued)

FOREIGN PATENT DOCUMENTS

| CA | 2524146 A1 | 3/2006 |
| DE | 10156037 A1 | 6/2003 |

(Continued)

OTHER PUBLICATIONS

Partial European Search Report dated Oct. 11, 2017 regarding EP Application No. 17172992.4 (17 pages).

(Continued)

*Primary Examiner* — Kevin A Lathers
(74) *Attorney, Agent, or Firm* — Harness, Dickey & Pierce, P.L.C.

(57) ABSTRACT

An intake air heating system for a vehicle includes an electrical switching device configured to selectively connect a battery of the vehicle to a heater coil in contact with intake air of the vehicle. The intake air heating system includes a control circuit configured to, in response to an enable signal from an engine controller, drive the electrical switching device to connect the battery to the heater coil at full current. The control circuit is configured to measure a resistance of the heater coil indicative of an initial temperature of the heater coil and, in response to an estimated temperature of the heater coil exceeding a desired temperature value, modulate the electrical switching device to reduce current from the battery of the vehicle to the heater coil.

17 Claims, 12 Drawing Sheets

(56) References Cited

U.S. PATENT DOCUMENTS

| | | | |
|---|---|---|---|
| 4,671,242 A * | 6/1987 | Akiyama | F02D 41/182 123/486 |
| 4,944,260 A | 7/1990 | Shea et al. | |
| 5,094,198 A | 3/1992 | Trotta et al. | |
| 5,347,966 A | 9/1994 | Mahon et al. | |
| 5,419,187 A * | 5/1995 | Uchiyama | G01F 1/692 73/114.34 |
| 5,666,254 A | 9/1997 | Thomas et al. | |
| 5,922,232 A | 7/1999 | Merz | |
| 5,990,459 A | 11/1999 | Feustel et al. | |
| 6,067,219 A | 5/2000 | Armstrong et al. | |
| 6,084,218 A | 7/2000 | McDonough | |
| 6,118,239 A | 9/2000 | Kadah | |
| 6,392,207 B2 | 5/2002 | Beetz et al. | |
| 6,477,047 B1 | 11/2002 | Markwardt et al. | |
| 6,606,228 B1 | 8/2003 | Potter, IV | |
| 6,635,851 B2 | 10/2003 | Uhl | |
| 6,680,964 B2 * | 1/2004 | Kim | H01S 5/18338 372/96 |
| 6,700,105 B2 | 3/2004 | Morrison | |
| 6,712,032 B2 | 3/2004 | Uhl et al. | |
| 6,715,472 B2 | 4/2004 | Stephan et al. | |
| 6,736,098 B2 | 5/2004 | Toedter et al. | |
| 6,807,041 B2 | 10/2004 | Geiger et al. | |
| 6,810,203 B2 | 10/2004 | Alban et al. | |
| 6,870,720 B2 | 3/2005 | Iwata et al. | |
| 6,872,922 B2 | 3/2005 | Uhl | |
| 6,906,288 B2 | 6/2005 | Toedter et al. | |
| 6,911,630 B2 | 6/2005 | Neckel | |
| 6,964,269 B2 | 11/2005 | Gschwind et al. | |
| 7,002,106 B2 | 2/2006 | Toedter et al. | |
| 7,044,115 B2 | 5/2006 | Gschwind et al. | |
| 7,190,893 B2 | 3/2007 | Kuebler et al. | |
| 7,259,945 B2 | 8/2007 | Cleveland | |
| 7,472,695 B2 | 1/2009 | Prust et al. | |
| 7,934,491 B2 * | 5/2011 | Navalon Carretero | F02M 31/13 123/549 |
| 8,003,922 B2 | 8/2011 | Seger | |
| 8,432,650 B2 | 4/2013 | Seger | |
| 8,981,264 B2 | 3/2015 | Seger | |
| 2002/0000221 A1 | 1/2002 | Kilb et al. | |
| 2002/0092508 A1 | 7/2002 | Kanekawa et al. | |
| 2004/0003800 A1 | 1/2004 | Gschwind et al. | |
| 2004/0025852 A1 | 2/2004 | Kanekawa et al. | |
| 2004/0126286 A1 | 7/2004 | deRuyter | |
| 2005/0034449 A1 | 2/2005 | Frieden et al. | |
| 2005/0092727 A1 | 5/2005 | Fraley et al. | |
| 2005/0120789 A1 | 6/2005 | Matsumoto et al. | |
| 2005/0235970 A1 * | 10/2005 | Carretero | F02M 31/13 123/549 |
| 2005/0257781 A1 | 11/2005 | Linkenhoger | |
| 2006/0150959 A1 | 7/2006 | Prust et al. | |
| 2007/0039596 A1 | 2/2007 | Navalon Carretero | |
| 2007/0062497 A1 | 3/2007 | Joppig et al. | |
| 2007/0139985 A1 | 6/2007 | Bax et al. | |
| 2007/0194009 A1 | 8/2007 | Seger | |
| 2010/0094523 A1 | 4/2010 | Kernwein et al. | |
| 2010/0125400 A1 | 5/2010 | McDonald et al. | |
| 2010/0292908 A1 | 11/2010 | Okinaka et al. | |
| 2012/0118254 A1 | 5/2012 | Leufen et al. | |

FOREIGN PATENT DOCUMENTS

| | | |
|---|---|---|
| DE | 102012004526 A1 | 9/2013 |
| EP | 1821573 A2 | 8/2007 |
| EP | 1852597 A1 | 11/2007 |
| WO | WO-2005012807 A2 | 2/2005 |

OTHER PUBLICATIONS

Steve Corrigan, "Introduction to the Controller Area Network (CAN)", Application Report SLOA101A, Aug. 2002 (Revised Jul. 2008), Jul. 30, 2008, pp. 1-16 (15 pages).

"Thermal Substrates: T-Clad," The Bergquist Company, http://www.bergquistcompany.com/ts.sub.--thermal.sub.--clad.cfm, Copyright 2006.

"Second Generation ISS Diesel Cold Start Technology with Preheated Intake air," Martin Blanc, Steffen Geiger, Hans Houben, Thomas Hovestadt and Olaf Toedter, MTZ, May 2006, vol. 67, pp. 10-13.

"3946 Half-Bridge Power MOSFET Controller," Allegro MicroSystems, Inc., Data Sheet, Copyright 2003, 2004.

"IR2117(S)/IR2118(S)&(PbF) Single Channel Driver," International Rectifier, Data Sheet No. PD60146 Rev N, Apr. 2, 2004.

Extended European Search Report for EP Application No. 17172992.4, dated Feb. 21, 2018, 13 pages.

European Written Opinion in related EP application No. 17172992.4 dated Oct. 2, 2018.

* cited by examiner

INTAKE AIR HEATING SYSTEM FOR A VEHICLE

CROSS-REFERENCE TO RELATED APPLICATIONS

The present application is a continuation-in-part of U.S. patent application Ser. No. 15/166,009 filed May 26, 2016. The entire disclosure of the application referenced above is incorporated by reference.

FIELD

The present disclosure relates to intake air heating systems in internal combustion engines and more particularly to electronic control of intake air heating systems.

BACKGROUND

An air-fuel mixture for an internal combustion engine is harder to ignite when cold, leading to less complete combustion and increased emissions. Once the engine has warmed up, the cylinders may warm the air-fuel mixture sufficiently. However, at startup, the engine may have no heat to contribute to the air-fuel mixture. Cold start conditions are especially severe when the ambient air temperature is low. An intake air heating system may be used to heat air arriving at the engine. This system may be located within or prior to the intake manifold. The intake air heating system may be brought up to temperature prior to attempting to start the engine.

Heating the intake air may allow for easier ignition and may hold the fuel in suspension more effectively, leading to fewer fuel droplets falling out of suspension in the air. Intake air heating systems may allow for faster starts of the engine, may reduce startup emissions (sometimes evidenced as "white smoke"), reduce engine wear, reduce overall battery consumption during startup, and reduce startup fuel consumption.

In FIG. 1, a not-to-scale illustration of a truck 100 includes an engine 104 and an air heater 108. While not shown, the intake manifold for the engine 104 may contain the air heater 108. Based on a control signal from an engine controller 112, an air heater controller 116 connects a battery 120 to the air heater 108.

For example, the air heater controller 116 may include an electromechanical relay. The air heater controller 116 may also include a timer so that the air heater 108 does not reach an over-temperature condition. However, if the engine 104 is started from a warm condition, where the air heater 108 is not cold but warm, this time-out may be too long, and the air heater 108 may experience an over-temperature condition. This may increase wear on the air heater 108.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An intake air heating system for a vehicle includes an electrical switching device configured to selectively connect a battery of the vehicle to a heater coil in contact with intake air of the vehicle. The intake air heating system includes a control circuit configured to, in response to an enable signal from an engine controller, drive the electrical switching device to connect the battery to the heater coil at full current. The control circuit is configured to measure a resistance of the heater coil indicative of an initial temperature of the heater coil and, in response to an estimated temperature of the heater coil exceeding a desired temperature value, modulate the electrical switching device to reduce current from the battery of the vehicle to the heater coil.

In other features, the control circuit is configured to estimate the temperature of the heater coil based on a sum of the initial temperature of the heater coil and a temperature increase. In other features, the control circuit is configured to estimate the temperature increase by repeatedly measuring a current value of current through the electrical switching device and accumulating a squared value of the measured current values.

In other features, the control circuit is configured to estimate the temperature increase based on a lookup table of temperature increases indexed by accumulated current squared values. In other features, the control circuit is configured to estimate the initial temperature of the heater coil based on a rate of rise of the resistance of the heater coil over a period of interest. In other features, the control circuit is configured to, prior to estimating the initial temperature of the heater coil, scale the rate of rise by a ratio of (i) a reference current squared value to (ii) the accumulated current squared value.

In other features, the control circuit is configured to measure the resistance of the heater coil by measuring a current value of current through the electrical switching device and a voltage value at a terminal of the electrical switching device and calculating the resistance of the heater coil based on a ratio of the measured voltage value to the measured current value. In other features, the control circuit is configured to measure a reference voltage at the terminal of the electrical switching device while the electrical switching device is off and subtract the reference voltage from the measured voltage value prior to calculating the resistance of the heater coil.

In other features, the electrical switching device comprises a plurality of transistors connected in parallel. In other features, the control circuit is configured to drive the electrical switching device using pulse-width modulation. In other features, the system includes a metal enclosure housing the electrical switching device and the control circuit. The electrical switching device is thermally coupled to the metal enclosure, which absorbs heat from the electrical switching device. In other features, the system includes a temperature sensor configured to measure a temperature of at least one of the control circuit, the electrical switching device, and the metal enclosure. The control circuit is configured to turn off the electrical switching device in response to the measured temperature exceeding a temperature threshold.

In other features, the system includes a transceiver configured to (i) receive the desired temperature value from the engine controller over a communications bus and (ii) provide the desired temperature value to the control circuit. In other features, the transceiver is configured to command the control circuit to enter a low-power mode in response to inactivity on the communications bus for more than a predetermined period of time. The transceiver is further configured to command the control circuit to enter an operating mode in response to receiving a predetermined signal on the communications bus. The control circuit consumes less power when in the low-power mode than when in the operating mode.

In other features, the battery is characterized by an internal resistance and the control circuit is configured to measure a first voltage of the battery while the battery is disconnected from the heater coil by the electrical switching device. The control circuit is further configured to, once the electrical switching device connects the heater coil to the battery, measure a second voltage of the battery and measure a current through the electrical switching device. The control circuit is further configured to determine the internal resistance based on the first voltage, the second voltage, and the current.

A method of operating an intake air heating system for a vehicle includes, in response to an enable signal from an engine controller, driving an electrical switching device to connect a battery to a heater coil at full current. The method includes measuring a resistance of the heater coil indicative of an initial temperature of the heater coil. The method includes, in response to the temperature of the heater coil exceeding a desired temperature value, modulating the electrical switching device to reduce current from the battery of the vehicle to the heater coil.

In other features, the method includes estimating the temperature of the heater coil based on a sum of the initial temperature of the heater coil and a temperature increase. In other features, estimating the temperature increase includes repeatedly measuring a current value of current through the electrical switching device and accumulating a squared value of the measured current values.

In other features, the method includes estimating the initial temperature of the heater coil based on a rate of rise of the resistance of the heater coil over a period of interest. In other features, the method includes, prior to estimating the initial temperature of the heater coil, scaling the rate of rise by a ratio of (i) a reference current squared value to (ii) the accumulated current squared value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
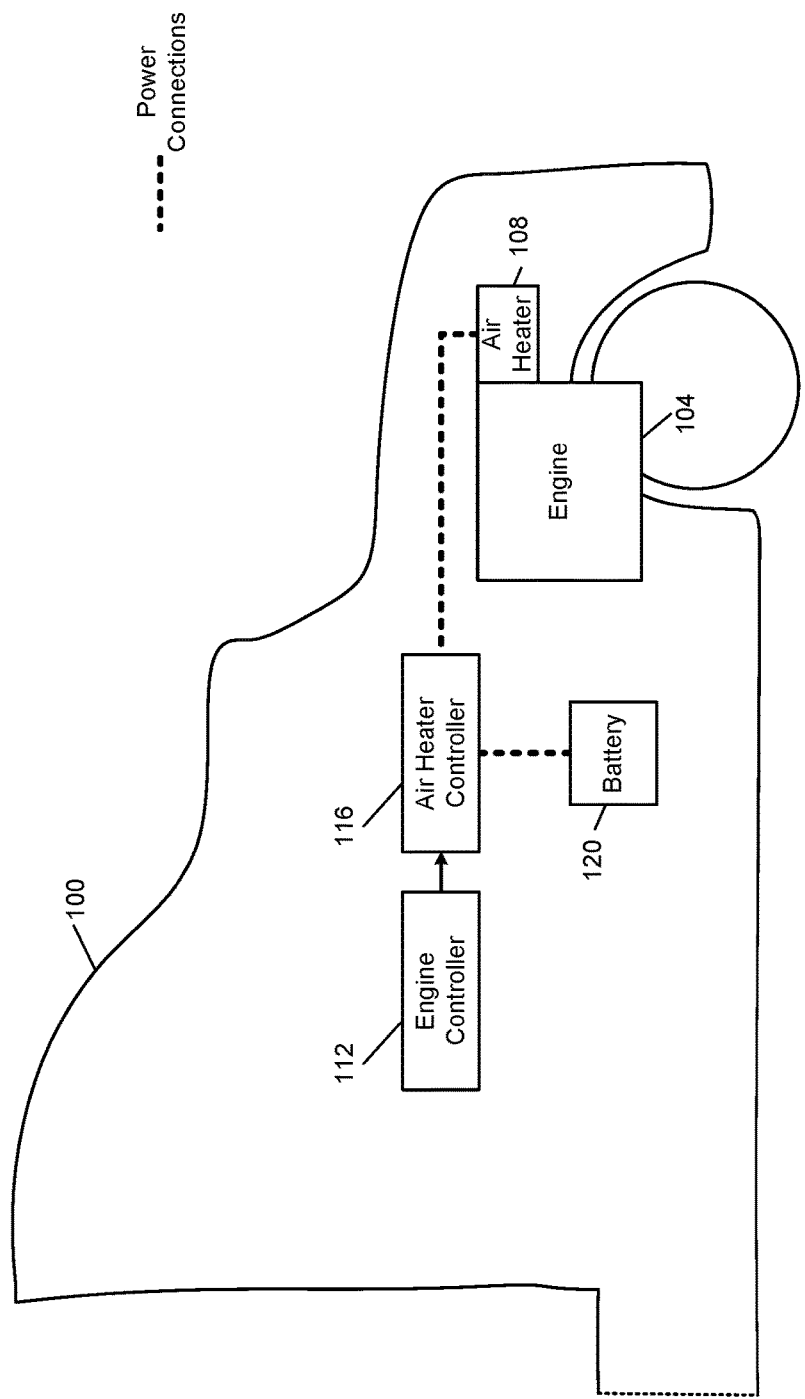
FIG. 1 is a functional block diagram of an engine with an intake air heating system.

In the prior art, an engine controller may actuate an intake air heater system for a predetermined period of time that is based on the amount of time expected for the intake air heater system to rise to operating temperature. This fixed time may not take into account the fact that the air heater may be warmer than ambient air, and does not take into account that a warmer ambient temperature allows the air heater come up to temperature more quickly.

An air heater controller according to the present disclosure is able to determine the air heater temperature and control the current provided to the air heater to reach and maintain a desired operating temperature. In this way, even if the engine controller actuates the air heater system for longer than necessary, the air heater will not reach an over-temperature condition.

Placing a temperature sensor within the air heater requires an additional part and additional wiring—for example, one or two additional leads running from the air heater controller to the air heater. Further, the high temperatures and, in some cases, presence of fuel may create reliability concerns for a temperature sensor. The inventors of the present disclosure have recognized that a resistive coil of the air heater itself acts as a form of thermistor, changing resistance as the temperature changes.

This change in heater coil resistance from a cold ambient starting temperature to operating temperature may be used to infer temperature and control the heating coil accordingly. Equivalently, the resistance itself may be used for control and compared against a target resistance corresponding to the operating temperature.

If the total change in heater coil resistance were orders of magnitude greater than the connection resistance between the air heater controller and the air heater, the connection resistance may be ignored. That may not be an accurate assumption and so connection resistance is determined and factored out. With a known resistance for the air heater, a first approach might be to simply measure the temperature of the air heater (without supplying power to the air heater), and calculating that the difference between the measured resistance and the known air heater resistance is the connection resistance.

However, the resistance of the air heater will change depending on the ambient air temperature. If the air heater controller included an ambient air temperature sensor or could receive ambient air temperature data, such as from the engine controller, the air heater controller could compensate for that resistance change based on predetermined empirical data about the resistance of the air heater in various ambient conditions.

Even with this ambient compensation, the air heater may not actually be at the ambient temperature. This will likely be true in a warm or hot start situation, where the engine has not "soaked" in the ambient temperature for a long enough period that all the engine components have returned to the ambient temperature. If the engine components have returned to the ambient temperature, such as when a vehicle is sitting overnight, this is referred to as a cold start. Without knowing the temperature of the air heater, the air heater controller cannot infer the resistance of the air heater in order to calculate the connection resistance.

In this disclosure, it will be assumed that the resistance of the air heater increases as the temperature increases. The resistance as well as its change with respect to temperature depends on the chemistry of the elements used in the air heater. Therefore, an apparently increased connection resistance may actually mean that the air heater is hotter than the ambient temperature.

Because the increased measured resistance of the air heater can mean either that the air heater is warmer than ambient or that the connection resistance is higher, a method of differentiating these has been developed. It has been observed experimentally that the rate of change of resistance is greatest at the beginning of the air heater warming up and slows down as the air heater reaches operating temperature. Therefore, the temperature of the air heater at the beginning of startup can be inferred based on the rate of change of resistance during startup.

Once the air heater temperature at startup is determined, its resistance may be known empirical data stored by the air heater controller. The resistance of the air heater can then be subtracted from the measured resistance at startup to determine the connection resistance. Because the connections to the air heater do not warm as much as the air heater itself, the temperature dependency of connection resistance can be ignored in some implementations as trivial.

Knowing the connection resistance and having preprogrammed the resistance of the air heater at an operating temperature (such as 600° C.), the air heater controller can modulate current being supplied to the air heater to achieve a desired resistance. Once the measured resistance is equal to the sum of the target heater resistance plus the connection resistance, the current can be reduced to maintain measure resistance at that level.

Measuring resistance is generally performed by measuring voltage and current and calculating their ratio. One additional complication is that the voltage may be measured at the air heater controller, but the ground reference of the air heater controller may be different from the effective ground seen by the air heater. As explained in more detail in FIG. 2 below, other electrical features of the engine, such as electric fans or electronic fuel injection pumps, may share a ground connection with the air heater. As voltage drops along the connection of the ground back to the battery, the voltage at the negative side of the air heater may not be at zero volts as the air heater controller expects, but at a higher voltage. Further, the ground reference of the air heater controller may also not be at the zero volts of the battery output terminal.

Therefore, in order to get an accurate reading of the voltage across the air heater, the air heater controller may need to measure the voltage on the negative side of the air heater. When no current is flowing through the air heater, the positive and negative side of the air heater will be at the same voltage. As a result, the air heater controller can (temporarily) turn off the air heater, measure the voltage, and then use that voltage as a reference of the negative voltage of the air heater.

The reference can be subtracted from the voltage at the positive side of the air heater when current is being supplied to the air heater. This reference (referred to as heater ground) voltage measurement can be performed as frequently as needed based on expected fluctuations in the heater ground. For example, if fluctuations of interest in the heater ground take place over the course of seconds rather than milliseconds, the heater ground measurement may be performed once per second.

Figure 2:
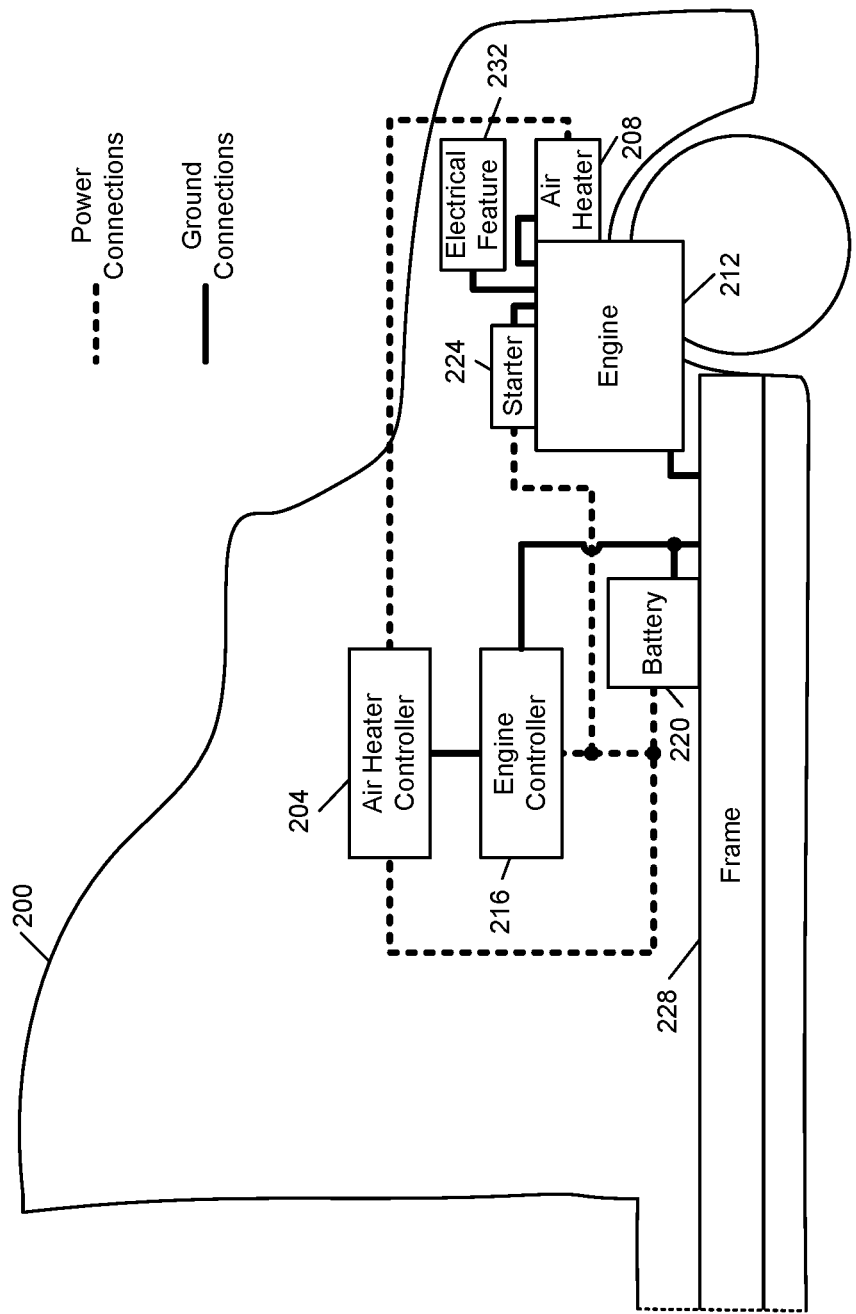
FIG. 2 is a functional block diagram of an engine with an intake air heating system showing selected power and ground connections.

Returning to the figures, FIG. 2 shows selected ground and power connections in a truck 200 configured with an air heater controller 204 and an air heater 208, according to the principles of the present disclosure. The air heater 208 selectively heats air being provided to an engine 212. The air heater controller 204 may be activated by engine controller 216. The air heater controller 204 provides current to the air heater 208 from a battery 220. A starter 224 selectively rotates the crankshaft of the engine and is also powered by the battery 220. While different reference numerals are used, the air heater controller 204 may be configured for use with the engine controller 112 and the air heater 108 of FIG. 1. In other words, the engine controller 112 may not need new programming in order to work with the air heater controller 204 of the present disclosure.

As seen by the dashed line, the battery 220 provides power to the starter 224, to the engine controller 216, and to the air heater controller 204, which selectively connects that power to the air heater 208. Meanwhile, the solid lines show the ground connections of the battery to a frame 228 of the truck 200 as well as to the engine controller 216. In some vehicles, the engine 212 is grounded to the frame 228. This is simply one grounding configuration shown for example, and the principles of the present disclosure are not limited to this configuration.

Other components, such as the air heater 208, the starter 224, and an additional electrical feature 232, may be grounded through the engine 212 (in particular, the engine block) to the frame 228. As a result, the effective ground voltage seen by the air heater 208 is based on the resistance of the ground path back to the battery 220 multiplied by the current following that same ground path. Generally, the starter 224 will not be running at the same time as the air heater 208.

However, other electrical features, such as the electrical feature 232, may be running at the same time as the air heater 208. The current drawn by the electrical feature 232 may cause the ground voltage of the air heater 208 to change. For example, the electrical feature 232 may be an electric fan or a component of electronic fuel injection, such as a fuel pump. This variation in the ground voltage seen by the air heater 208 is measured and removed, as described in more detail below.

Figure 3A:
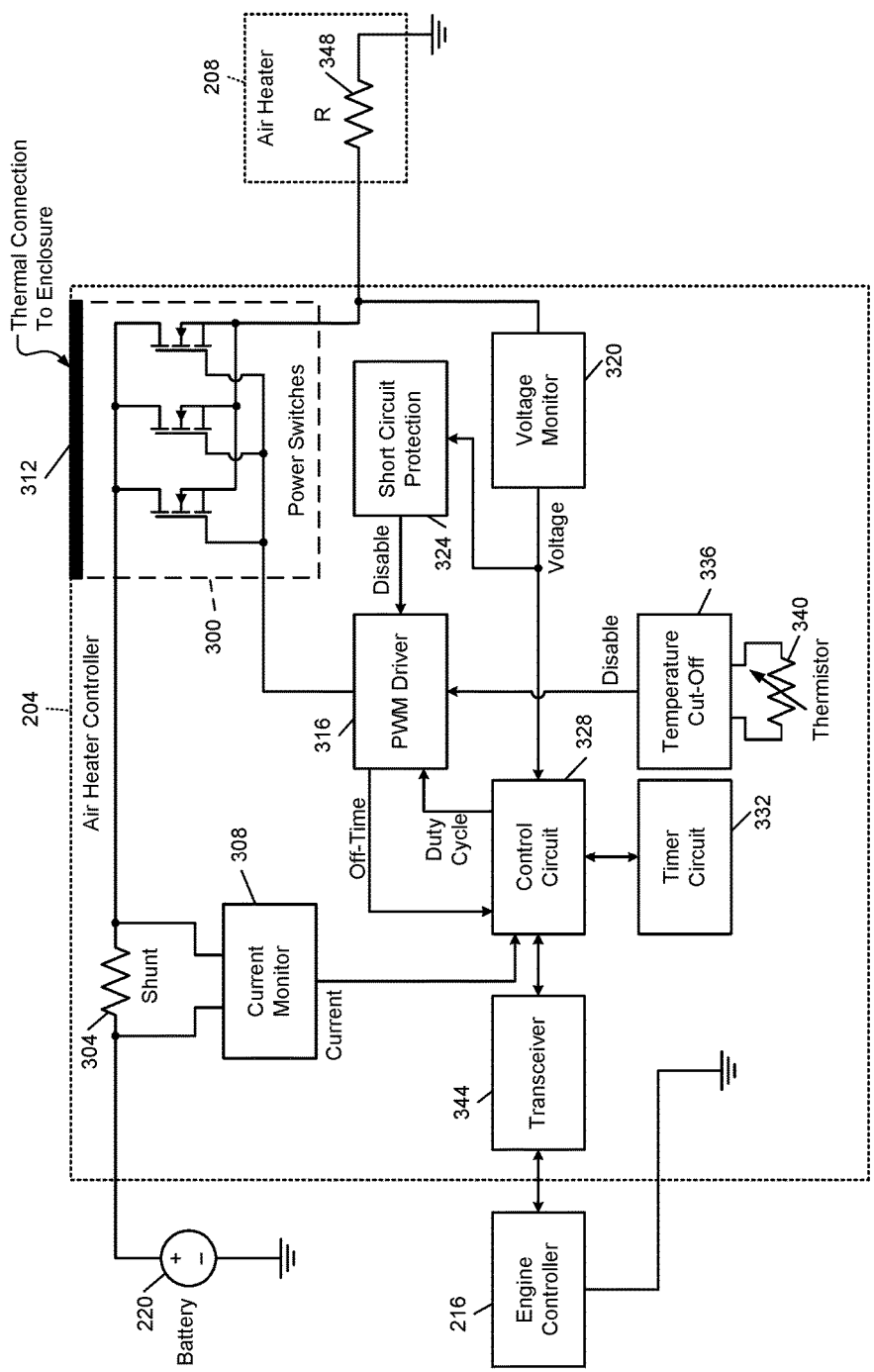
FIG. 3A is a functional block diagram of an example implementation of an air heater controller.

In FIG. 3A, an example implementation of the air heater controller 204 includes one or more power switches 300 that selectively connect the battery 220 to the air heater 208. A shunt resistor 304 may be placed in series with the power switches 300 and a voltage across the shunt resistor 304 is measured by a current monitor 308 to determine the amount of current flowing through the power switches 300.

The power switches 300 are arranged in parallel and may be controlled by the same gate signal. The power switches 300 may be included in a single package or in multiple packages that are thermally connected to a heat sink, such as an enclosure of the air heater controller 204. A thermal connection 312 is shown for illustration in FIG. 3A and may take the form of direct metal-to-metal contact or a thermal paste.

To protect against reverse battery connection, a diode may be placed in series with the power switches 300 to prevent backflow of current toward the battery 220. This diode may take the form of multiple diodes in parallel and each of the diodes may actually be an electrical switch configured to operate as a diode. For example, a set of electrical switches connected in parallel may be controlled to create an open circuit when voltages across the set of electrical switches indicate that current is flowing toward the battery 220.

The power switches 300 are driven by a pulse-width modulation (PWM) driver 316. For example, during an initial power-up phase, the duty cycle of the PWM may be set to 100% so that the power switches 300 remain on constantly to provide power to the air heater 208. The PWM driver 316 may control the power switches 300 to produce shaped pulses to avoid producing excessive electrical emissions. For more information, see U.S. Pat. No. 7,472,695, issued Jan. 6, 2009, titled "Controller for Air Intake Heater," with first-named inventor Andrew Prust, the entire disclosure of which is incorporated by reference.

A voltage monitor 320 measures the load voltage—that is, the voltage at the node between the power switches 300 and the air heater 208. The voltage monitor 320 may need to measure a voltage that is as much as 500 mV below the ground of the air heater controller 204 when determining the effective ground voltage seen by the air heater 208.

A short circuit protection circuit 324 outputs a disable signal to the PWM driver 316 if the voltage measured by the voltage monitor 320 is too low. If there is a short circuit or a partial short circuit in the air heater 208, the voltage measured by the voltage monitor 320 will be much lower than normal. For example, the expected voltage across the air heater 208 may be 10 or 11 volts and the threshold may therefore be set at five volts. The short circuit protection circuit 324 may operate in the analog domain and provide quicker response than a microprocessor, which may need to startup and execute boot code before assessing the voltage from the voltage monitor 320.

In other implementations, the short circuit protection circuit 324 may operate based on the current measured by the current monitor 308. For example, the short circuit protection circuit 324 may identify a short circuit in response to the measured current exceeding a threshold for longer than a predetermined period of time. In various implementations, the short circuit protection circuit 324 may receive voltage and current and identify a short circuit based on either voltage or current conditions occurring.

A control circuit 328, which as described below may be a programmable logic device, a microprocessor and memory, etc., receives the measured voltage and the measured current and instructs the PWM driver 316 with a commanded duty cycle. The PWM driver 316 may send back an indication of when the power switches 300 are off. The control circuit 328 may then take voltage measurements while the power switches 300 are off in order to determine the effective ground voltage seen by the air heater 208.

The control circuit 328 may include an analog-to-digital converter (ADC) for measuring the current and the voltage. If the same ADC is multiplexed to measure both the current and the voltage, some ADC errors or non-linearity may cancel when the voltage and current are divided to calculate resistance.

A timer circuit 332, which may be integrated within the control circuit 328, times various periods of interest to the control circuit 328. For example, one timer may measure the entire time that the air heater 208 has been heating up for the current actuation of the air heater 208. Another timer may track how frequently the ground voltage for the air heater 208 is checked. Another timer may measure the period between resistance measurements.

A temperature cut-off 336 supplies a disable signal to the PWM driver 316 in response to a temperature of the air heater controller 204 increasing above a threshold. For example, a thermistor 340 may measure a temperature of an enclosure of the air heater controller 204, a package of one or more of the power switches 300, etc.

The control circuit 328 receives a signal requesting intake air heating from the engine controller 216. For example, a single conductor from the engine controller 216 to the control circuit 328 may be asserted to request intake air heating while a second conductor between the engine controller 216 and the control circuit 328 is used for the control circuit 328 to signal back an error condition.

In some implementations, the signal provided to the control circuit 328 is binary, indicating either that intake air heating is requested or is not requested. In other implementations, the signal may be modulated in either the analog or digital domains to indicate a degree of heating requested, such as a certain desired temperature of the heater.

Similarly, the signal returned to the engine controller 216 from the control circuit 328 may be a binary signal indicating either that there is no error or that there is an error. This return signal could also be modulated in the analog or digital domains to indicate the type of error or to indicate other conditions, such as the air heater 208 having reaching operating temperature. In some implementations, a transceiver 344 allows the control circuit 328 to communicate with the engine controller 216 over a vehicle bus, such as the controller area network (CAN) bus or the J1939 bus.

In various implementations, components of the air heater controller 204, such as the control circuit 328, may be configured to turn off completely or enter a low-power state. For example, the transceiver 344 may command the components of the air heater controller 204 to enter low-power states in response to having received no signals from the engine controller 216 for more than a predetermined period of time. The transceiver 344 may wait for a predetermined wake-up signal or packet before returning the air heater controller 204 to full-power mode. When returning to full-power mode, the control circuit 328 may need to perform a startup routine prior to running the operational code that controls the PWM driver 316.

In FIG. 3A, while the intrinsic connection resistances are not shown, the resistance of the element in the air heater 208 is shown schematically as a resistor 348. Meanwhile, the battery 220 may be characterized by an internal resistance (not shown), which may be one indication of the health of the battery 220. The control circuit 328 may measure a first voltage of the battery 220 with the power switches 300 off. For example, the control circuit 328 may receive a voltage value of one of the terminals of the shunt resistor 304 measured by the current monitor 308. The control circuit 328 can then turn on the power switches 300 and measure a second voltage of the battery 220 and the current through the shunt resistor 304. The internal resistance of the battery can then be calculated by the control circuit 328 as the difference between the first and second voltages divided by the current.

When the voltage measured by the voltage monitor 320 is divided by the current measured by the current monitor 308, the resulting resistance will be approximately equal to a resistance of the resistor 348 plus the connection resistances experienced between the air heater controller 204 and the air heater 208 as well as the air heater 208 back to the battery 220.

Figure 3B:
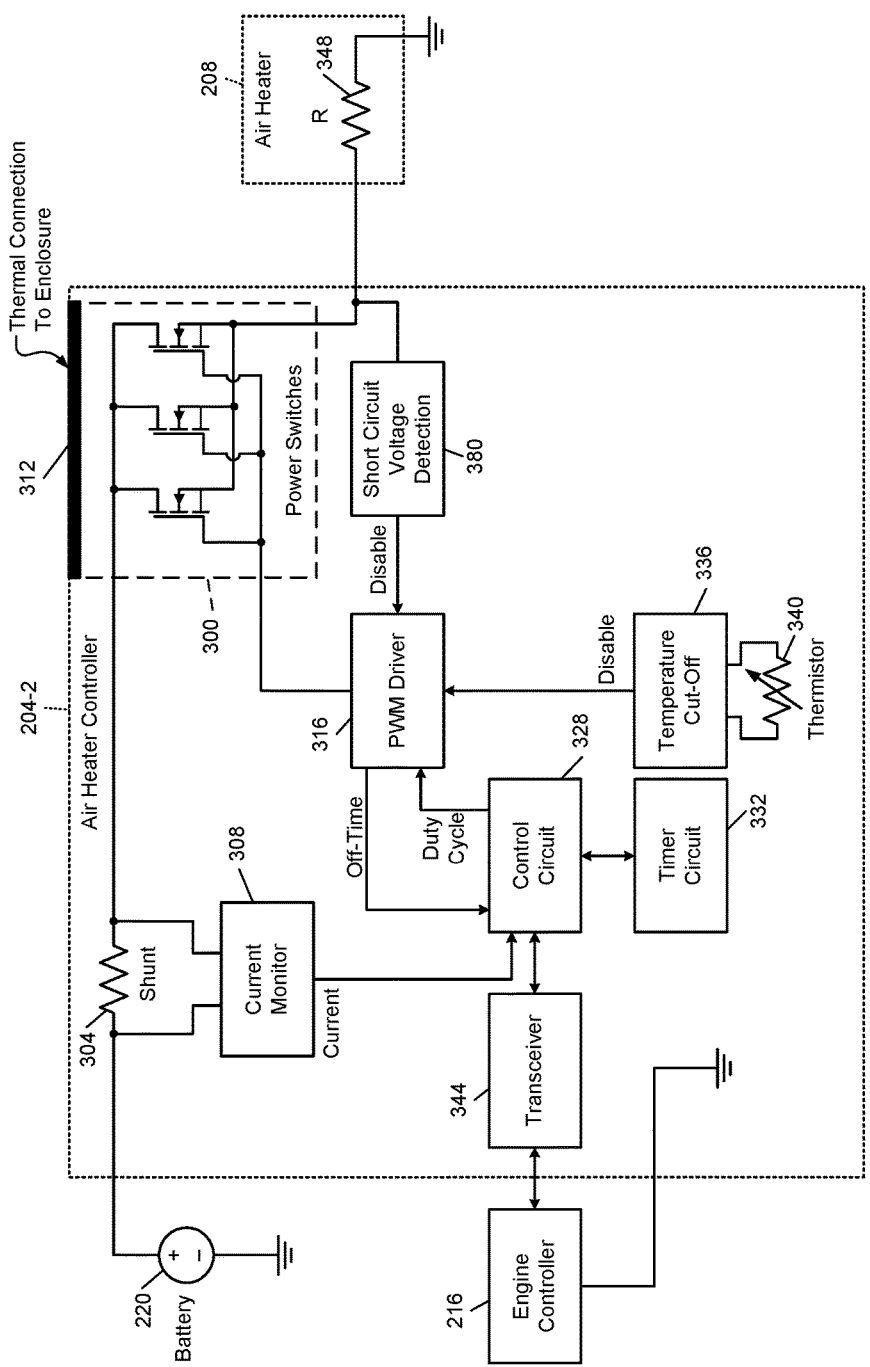
FIG. 3B is a functional block diagram of another example implementation of an air heater controller.

FIG. 3B is a block diagram of another example implementation of the air heater controller 204 and is labeled 204-2. Many components of the air heater controller 204-2 are similar to those of the air heater controller 204 in FIG. 3A. In FIG. 3B, the voltage monitor 320 of FIG. 3A is omitted.

Further, the short circuit protection circuit 324 is replaced with a short circuit voltage detection circuit 380. When the short circuit voltage detection circuit 380 detects a voltage representative of a short circuit across the resistor 348, a disable signal is sent to the PWM driver 316. For example, the short circuit voltage detection circuit 380 may include an analog voltage comparator that generates the disable signal in response to the voltage measured across the resistor 348 being less than a predetermined reference voltage.

Figure 4:
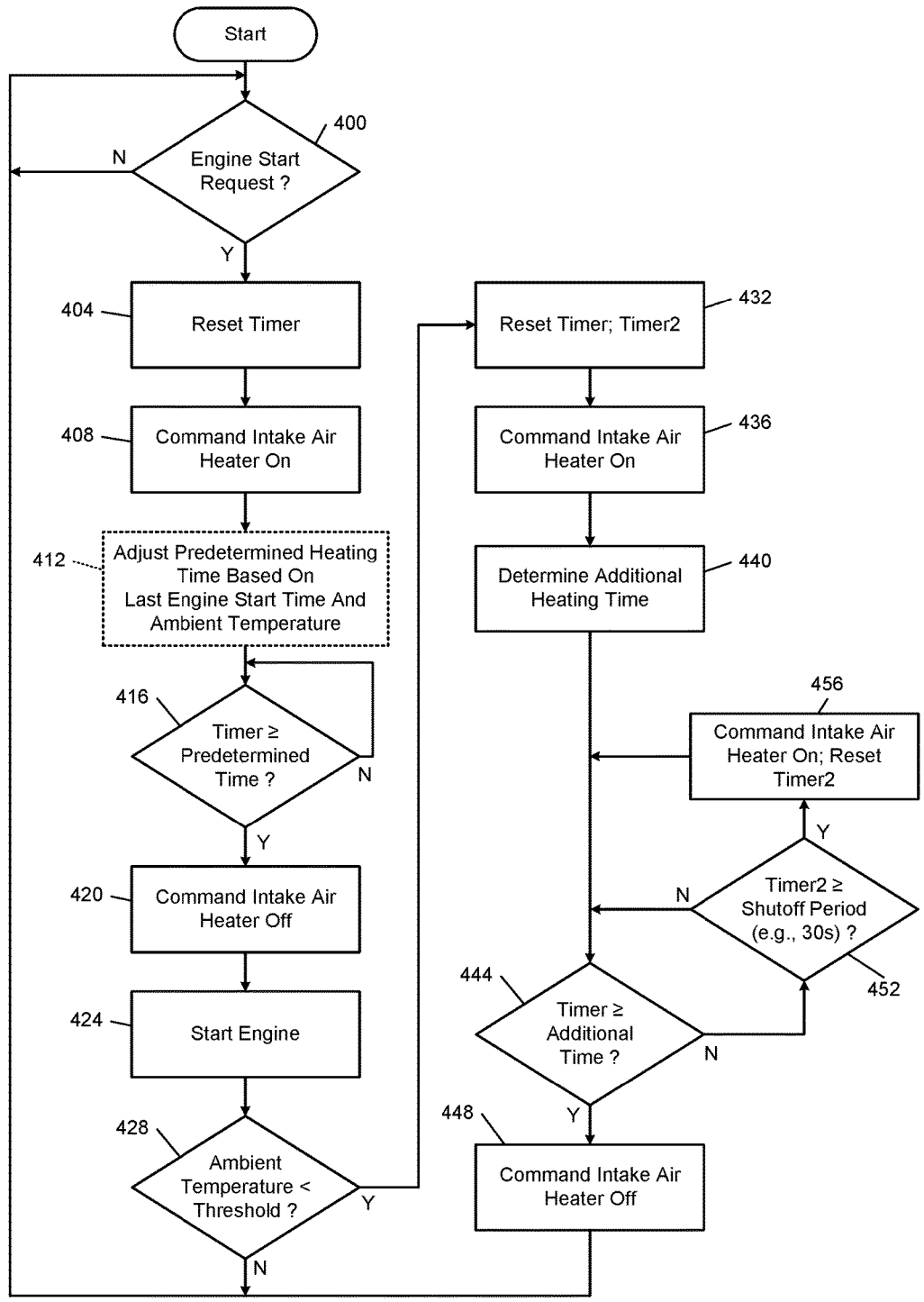
FIG. 4 is a flowchart of example engine controller operation related to starting an engine having an intake air heating system.

In FIG. 4, example operation related to engine starting for the engine controller begins at 400. If an engine start request is made, such as by a driver of the vehicle, control transfers to 404; otherwise, control remains in 400. At 404, control resets a timer, which starts at zero and counts upward. At 408, control commands the intake air heater to turn on.

At 412, an optional action is performed. The engine controller may have a predetermined time within which the intake air heater is expected to rise to operating temperature. The engine controller may adjust that predetermined heating time based on last engine start time and the ambient temperature. When the ambient temperature is higher, the predetermined heating time is reduced because the intake air heater will be able to come up to operating temperature more quickly. Further, if the last engine start time is relatively recent, the predetermined heating time may be reduced in proportion to how recent the last engine start time was.

At 416, control compares the timer to the predetermined time, which may have been adjusted at 412. Once the timer exceeds the predetermined time, control transfers to 420. At 420, control commands the intake air heater to turn off so the battery capacity can be used by the starter. At 424, control starts the engine. Though a complicated process for the engine controller, the engine starting details may not be relevant to intake air heater control and are not shown.

At 428, after the engine is started, control determines whether the ambient temperature is less than a cold starting threshold. If so, control transfers to 432; otherwise, control returns to 400. At 432, control resets the timer and also resets a second timer, Timer2. The timer will be used to track additional intake air heating to facilitate engine warmup after starting. The second timer, Timer2, will be used to track a shutoff time of the intake air heating system. For example, the engine controller may determine that the intake air heater should remain on for two minutes. However, the intake air heating system may include an internal shutoff after 30 seconds. Therefore, Timer2 tracks this 30-second interval and renews the request for intake air heating after each 30 seconds.

At 436, control commands the intake air heater to turn on. At 440, control determines how much additional heating time is desired. This additional heating time may increase as the ambient temperature decreases. At 444, control compares a timer to the additional time determined at 440. If the additional time has elapsed, control transfers to 448; otherwise, control transfers to 452. At 448, the additional time for intake air heating is completed and control commands the intake air heater to turn off. Control then returns to 400.

At 452, control compares Timer2 to the shutoff period of the intake air heating system. For example, the shutoff period may be 30 seconds. If Timer2 has exceeded the shutoff period, control transfers to 456; otherwise, control returns to 444. At 456, control commands the intake air heater to turn on and resets Timer2. Control then returns to 444.

Figure 5:
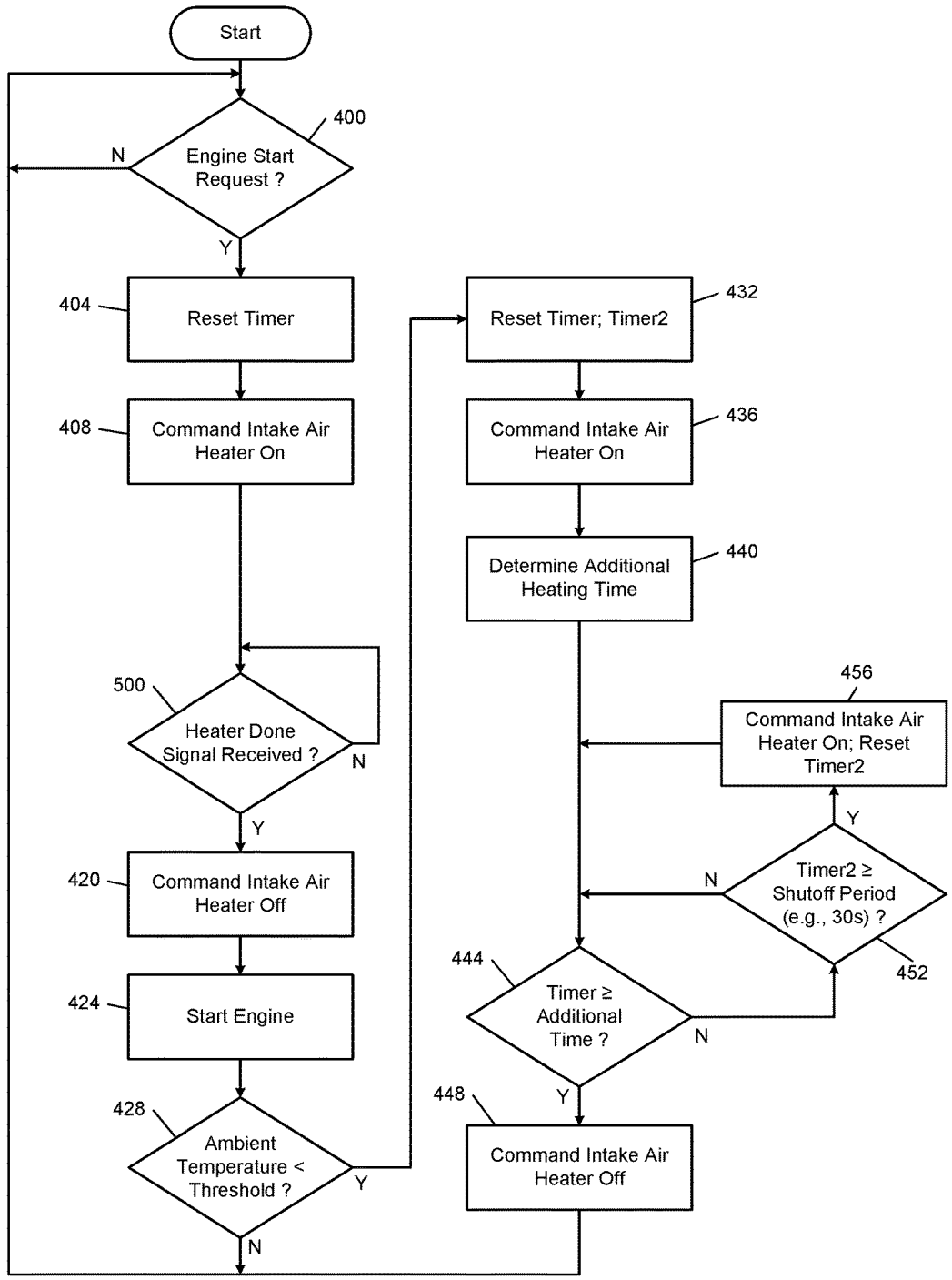
FIG. 5 is a flowchart of alternative engine controller operation for starting an engine having an intake air heating system.

In FIG. 5, operation of the engine controller may be adapted based on feedback provided by the intake air heating system. When the intake air heating system is able to indicate that the heater has reached the operating temperature, the engine controller may be able to start the engine sooner. Reference numerals from FIG. 4 are used to indicate similar operations in FIG. 5. After commanding the intake air heater on at 408, control determines at 500 whether an indication that the heater is done has been received. If such a heater done signal has been received, control transfers to 420; otherwise, control remains at 500.

Figure 6A:
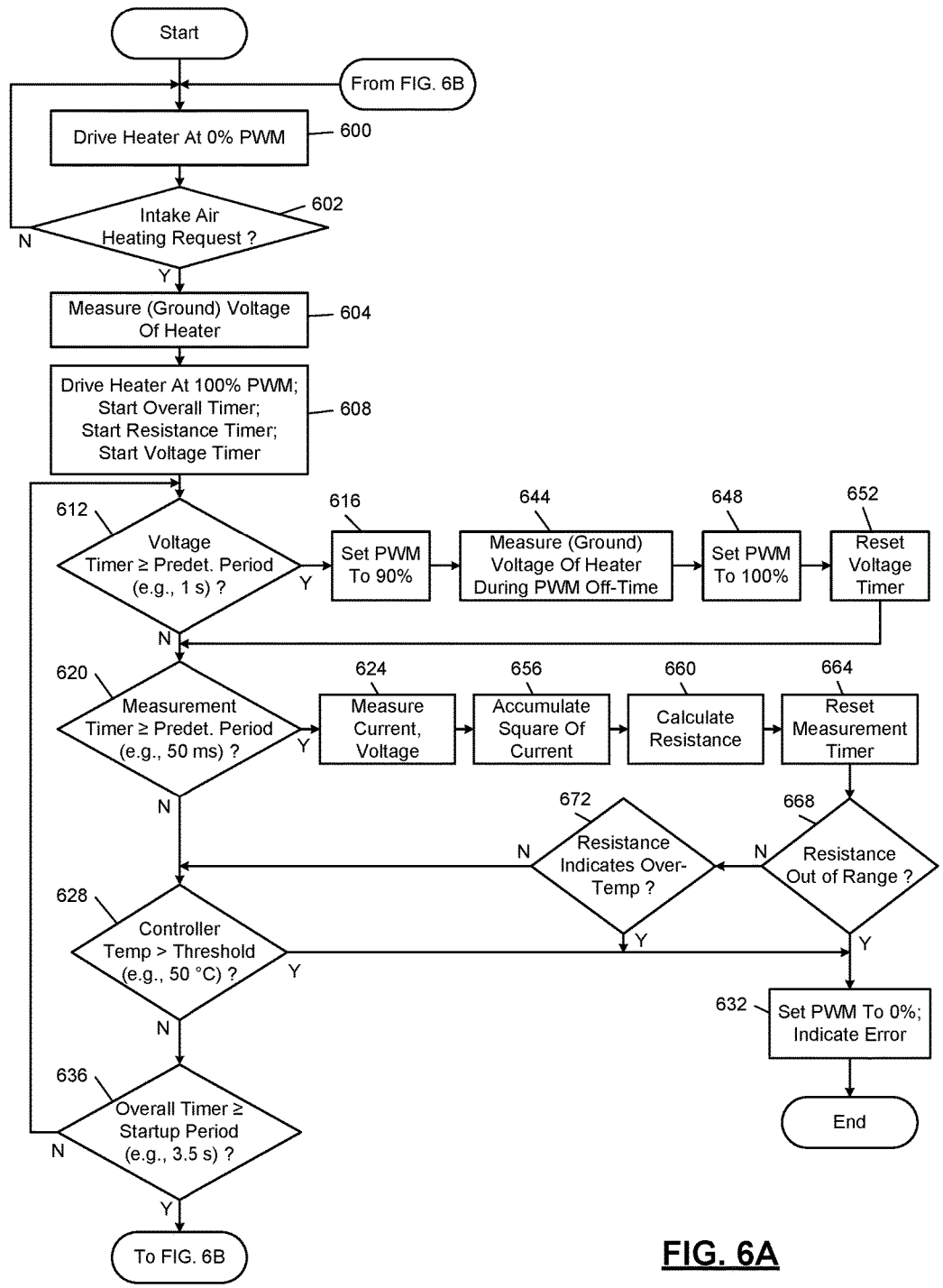
FIG. 6A and FIG. 6B together are a flowchart of example operation of an air heater controller according to the principles of the present disclosure.

In FIG. 6A, example control performed by an intake air heating system begins at 600. For example, the control performed in FIG. 6A and FIG. 6B may be implemented as programming, such as computer-readable instructions, in the control circuit 328 of FIG. 3A or FIG. 3B. At 600, before an intake air heating request is received, control turns the heater off, such as by driving the heater using a 0% duty cycle pulse-width modulation (PWM). At 602, if an intake air heating request has been received, control transfers to 604; otherwise, control remains in 600.

At 604, control measures the voltage of the heater. Because no current is supplied to the heater, the voltage dropped across the heater is zero and the measured voltage is therefore the voltage at the negative side of the heater. As discussed above, this voltage may not be zero because of other current draws traveling across the same ground path as the intake air heater. This measured voltage is referred to as the ground voltage of the heater.

At 608, control drives the heater at 100% duty cycle PWM. In addition, control starts three timers: an overall timer, a measurement timer (for timing periods between resistance measurements), and a voltage timer (timing periods between ground voltage measurements). At 612, if the voltage timer is greater than or equal to a predetermined voltage measurement interval (such as one second), control transfers to 616; otherwise, control transfers to 620. In other implementations, the voltage measurement interval may not be set, and ground voltage measurement may instead be performed if the voltage measured at the switching elements changes at greater than a predetermined rate. For example, a change in voltage of over 50 mV within 200 milliseconds may indicate the need to reacquire the ground voltage.

At 620, control determines whether the measurement timer is greater than or equal to a predetermined resistance measurement interval (such as 50 milliseconds). If so, control transfers to 624; otherwise, control transfers to 628.

At 628, control determines whether the temperature of the controller is greater than a threshold. If so, control transfers to 632; otherwise, control continues at 636. At 636, control determines whether the overall timer is greater than or equal to a predetermined startup window (for example, 3.5 seconds). If so, control transfers to 640 of FIG. 6B; otherwise, control returns to 612. Note that the order of operations shown in FIG. 6A and FIG. 6B may be changed without departing from the teachings of the present disclosure. As a specific example, the tests at 612 and 620 may be reversed in order.

At 616, it is time for a ground voltage measurement. However, since the heater has been driven at 100% duty cycle, there is no off time in which to measure the ground voltage. Therefore, the PWM duty cycle is set to 90%. At 644, control measures the ground voltage of the heater during the next PWM off-time (that is, the 10% of the PWM period when the searches are turned off). At 648, control sets the PWM back to 100%. At 652, control resets the voltage timer and continues at 620.

At 624, it is time to measure resistance and therefore the current and voltage are measured. At 656, an accumulation of a square of the current value is also determined. This will be used in FIG. 6B to scale the rate of change of the resistance based on the conditions present in lab measurements.

At 660, control calculates resistance by dividing the measured voltage by the current. First, however, the measured voltage is adjusted by the most-recently measured ground voltage (measured either at 644 or 604). The measured ground voltage indicates a voltage across the connection resistance caused by a current draw other than that of the heater. At 664, control resets the measurement timer and continues at 668. If the resistance measured is outside an expected range (either below a minimum possible resistance, such as the lowest air intake heater resistance and zero connection resistance, or greater than an upper limit, such as the greatest expected heater resistance plus the greatest expected connection resistance), control transfers to 632; otherwise, control transfers to 672.

At 632, control sets the PWM to zero percent, thereby stopping the supply of current to the air heater. Control also indicates an error back to the engine controller and ends. At 672, control determines whether the resistance indicates an over-temperature condition. If so, control transfers to 632; otherwise, control transfers to 628. An over-temperature condition is indicated by the measure resistance being greater than the limit. For example, the limit may be based on a previously-measured connection resistance plus the resistance of the heater at a temperature that is considered to be too high. The connection resistance from prior startups may be increased by a predetermined percentage (such as 10% or 20%) to prevent false positives in the over-temperature check.

Figure 6B:
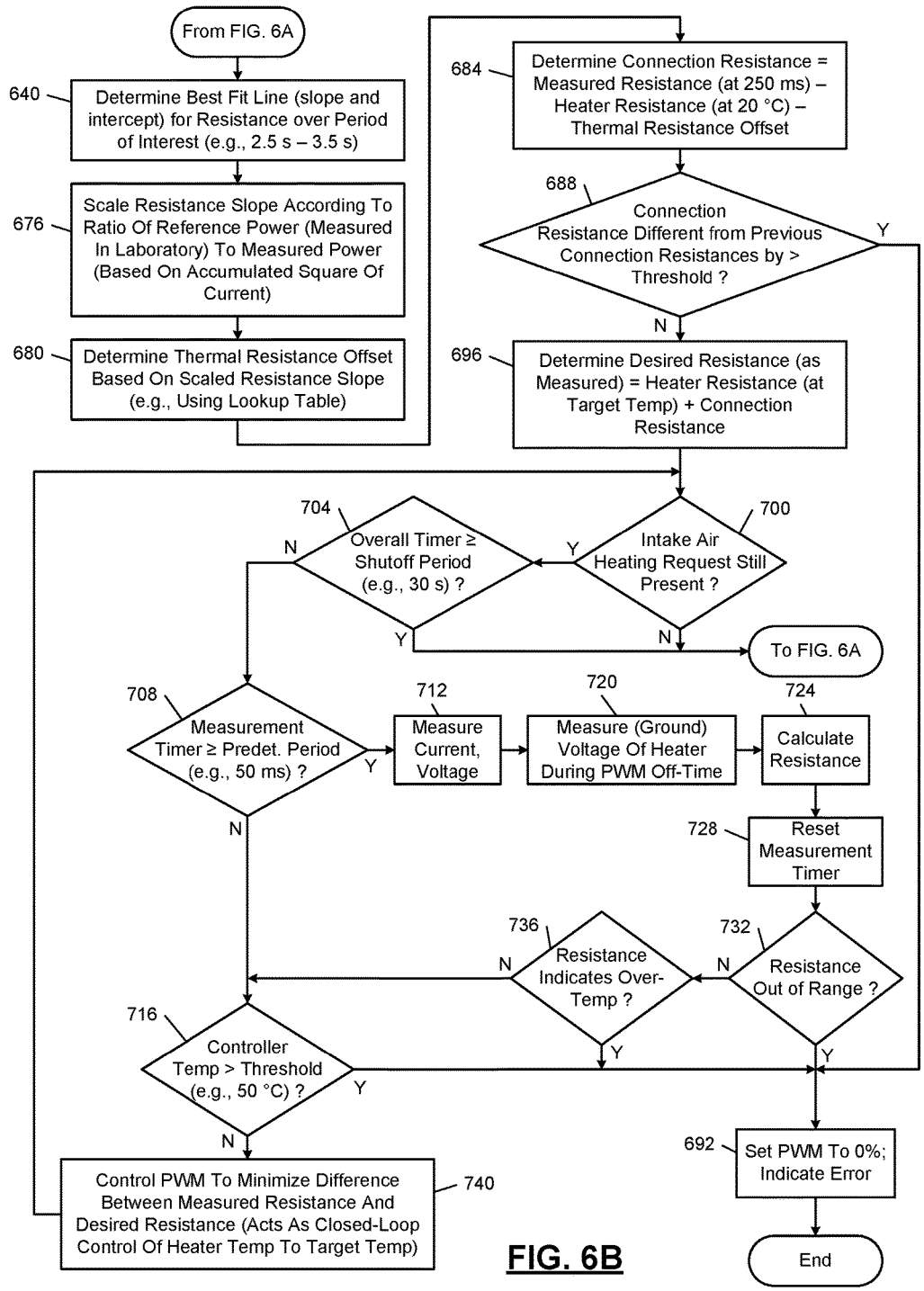

At 640 in FIG. 6B, the initial startup period has elapsed and control determines a best fit line for the measured resistance over a period of interest. For example, the period of interest may be half a second before and after the three second mark (where three seconds is the amount of time since the air intake heater was first turned on). The best fit line provides a slope and an intercept.

One technique of linear regression using least-squares fitting uses vertical distances from an array of points to a line described by y=mx+b, where m is the slope of the line and b is the y intercept. The method calculates the square of the distances described by $y_i-(mx_i+b)$ and minimizes the sum of the squared distances. To fit the line to the points the following moments are calculated for the set of points:

$\Sigma x_i^2$ $\Sigma x_i$ $\Sigma y_i$ $\Sigma x_i y_i$

With N being the number of points summed, the y-intercept, b, is:

$$b = \frac{(\Sigma x_i^2)(\Sigma y_i) - (\Sigma x_i)(\Sigma x_i y_i)}{N(\Sigma x_i^2) - (\Sigma x_i)^2}$$

and the slope, m, is:

$$m = \frac{N(\Sigma x_i y_i) - (\Sigma x_i)(\Sigma y_i)}{N(\Sigma x_i^2) - (\Sigma x_i)^2}$$

As the air heater heats up, the calculations above can be performed by calculating r and t every 100 milliseconds and placing the points in an array. As the number N builds up from 1 to 15 calculate m for the slope. After there are N=15 points in the array a FIFO (first in first out) process can be used to calculate the slope of the latest 15 points.

Control continues at 676, where the determined resistance slope from the best fit line is scaled. To account for differences in the power provided to the intake air heater during the present heating cycle compared to the heating cycle performed in the laboratory, the resistance slope is multiplied by the power measured in the lab (that is, the square of the current provided to the air heater in the lab) divided by the measured power (that is, the accumulated value of the square of the current).

At 680, the scaled resistance slope is used to determine a thermal resistance offset. In other words, this indicates the difference in resistance between the heater at a reference temperature (such as 20° C.) and the resistance of the heater at startup. For example, a lookup table may have a range of values of scaled resistance slopes and a corresponding set of values of thermal resistances offsets. Values of the scaled resistance slope falling between values in the lookup table may be interpolated using a linear or higher order interpolation. In other implementations, a mathematical expression may be determined from empirical data that maps scaled resistances sloped to thermal resistances offset.

An example of the lookup table is as follows:

| Apparent Heater Temp at Startup (° C.) | Resistance Slope | Heater Thermal Offset Value |
| --- | --- | --- |
| 880 | 0.0407 | 5.70 |
| 780 | 0.0820 | 5.50 |
| 680 | 0.1270 | 5.10 |
| 580 | 0.1715 | 4.70 |
| 480 | 0.2163 | 4.10 |
| 380 | 0.2609 | 3.40 |
| 280 | 0.3049 | 2.60 |
| 180 | 0.3478 | 1.80 |
| 80 | 0.39 | 0.80 |
| 20 | 0.4150 | 0.00 |
| −10 | 0.4354 | −0.30 |
| −40 | 0.4654 | −1.10 |

At 684, control is now able to determine the connection resistance present in series with the air heater by subtracting the heater resistance at the reference temperature (such as 20° C.) and the thermal resistance offset from the resistance measured at startup. In some implementations, the measured resistance at startup may be taken not at the very first reading, but instead at some small amount of time later (such as 250 milliseconds) to avoid errors caused by startup transients. For example, the small amount of time may mean less than one second.

At 688, control determines whether the calculated connection resistance is different from previously determined connection resistances by more than a threshold. If so, this may indicate a loose connection and control transfers to 692. Otherwise, control continues at 696. At 696, control determines the desired resistance (as will be measured) for the heater when the heater reaches the target operative temperature. The desired resistance may be calculated as the sum of the heater resistance at the target temperature and the calculated connection resistance. In various implementations, the target temperature value may be received from the engine control module (such as via a transceiver over a communications bus).

Control continues at 700, where if the intake air heating request is still present, control transfers to 704; otherwise, control returns to 600 in FIG. 6A. At 704, if the overall timer has exceeded a shutoff period, control also returns to 600 of FIG. 6A; otherwise, control continues at 708. At 708, control determines whether the measurement timer is greater than or equal to the resistance measurement interval. If so, control transfers to 712; otherwise, control transfers to 716.

At 712, control measures current and voltage. At 720, control measures the ground voltage of the heater during a PWM off-time. If the intake air heater is still being driven at 100% duty cycle, control will set the PWM to a lower percentage, such as 90%, before the measurement and then return the duty cycle to 100% (as shown at 616 and 648 of FIG. 6A). Control continues at 724, where the resistance is calculated. At 728, control resets the measurement timer and continues at 732.

At 732, if the calculated resistance is out of range, control transfers to 692; otherwise, control transfers to 736. At 736, if the resistance indicates an over-temperature condition, control transfers to 692; otherwise, control continues at 716. At 716, if the controller temperature is greater than threshold, control transfers to 692; otherwise, control continues at 740.

At 740, control sets the PWM duty cycle to minimize the difference between the measured resistance and the desired resistance from 696. In other words, this acts as closed-loop control of the heater temperature to achieve the target operating temperature. For example, control may use proportional-integral or proportional-integral-derivative control with predetermined constants, where the figure of merit is the difference between the measured and desired temperatures. Control then returns to 700 for another iteration of closed-loop control.

Figure 7A:
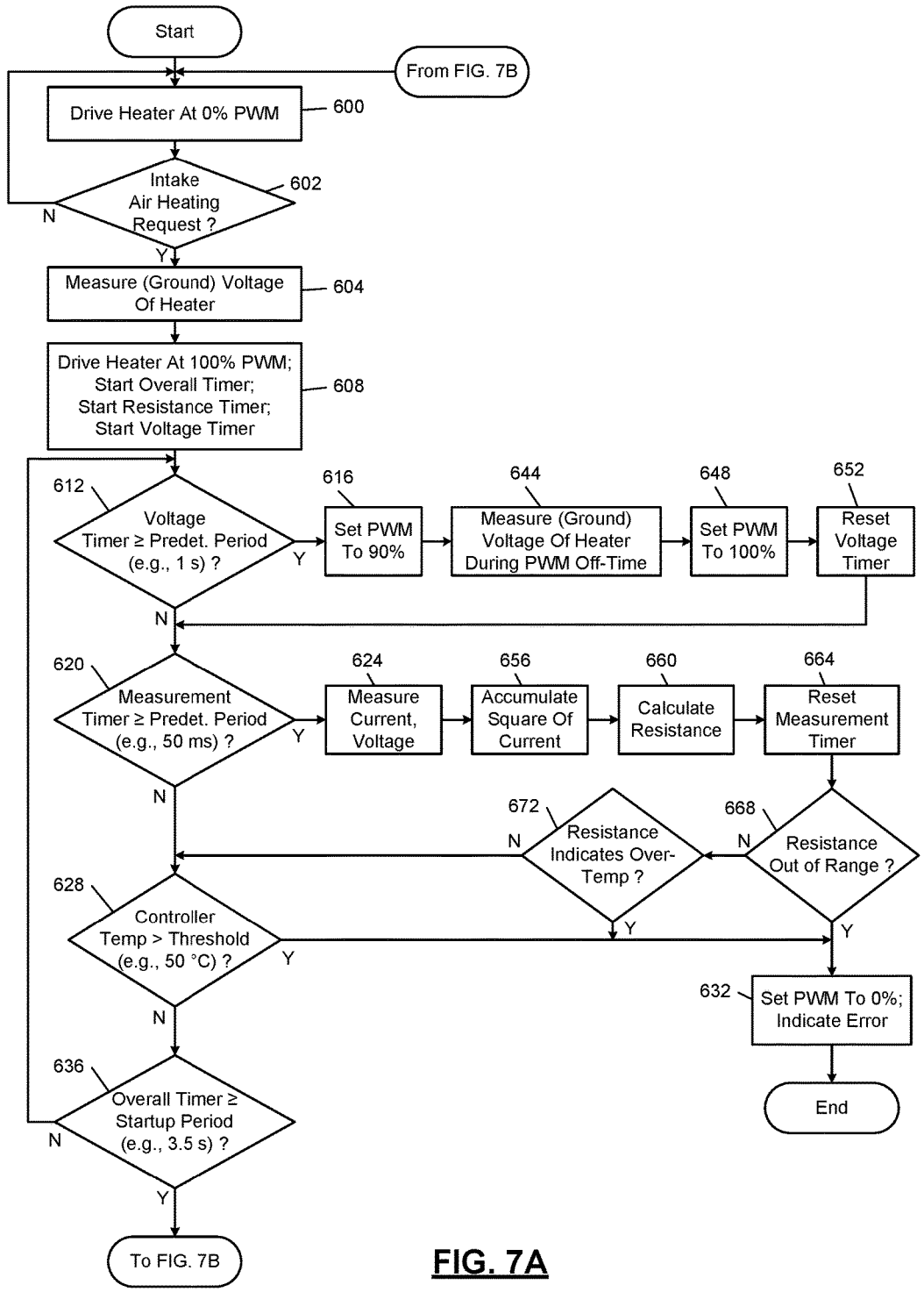
FIG. 7A and FIG. 7B together are another flowchart of example operation of an air heater controller according to the principles of the present disclosure.
Figure 7B:
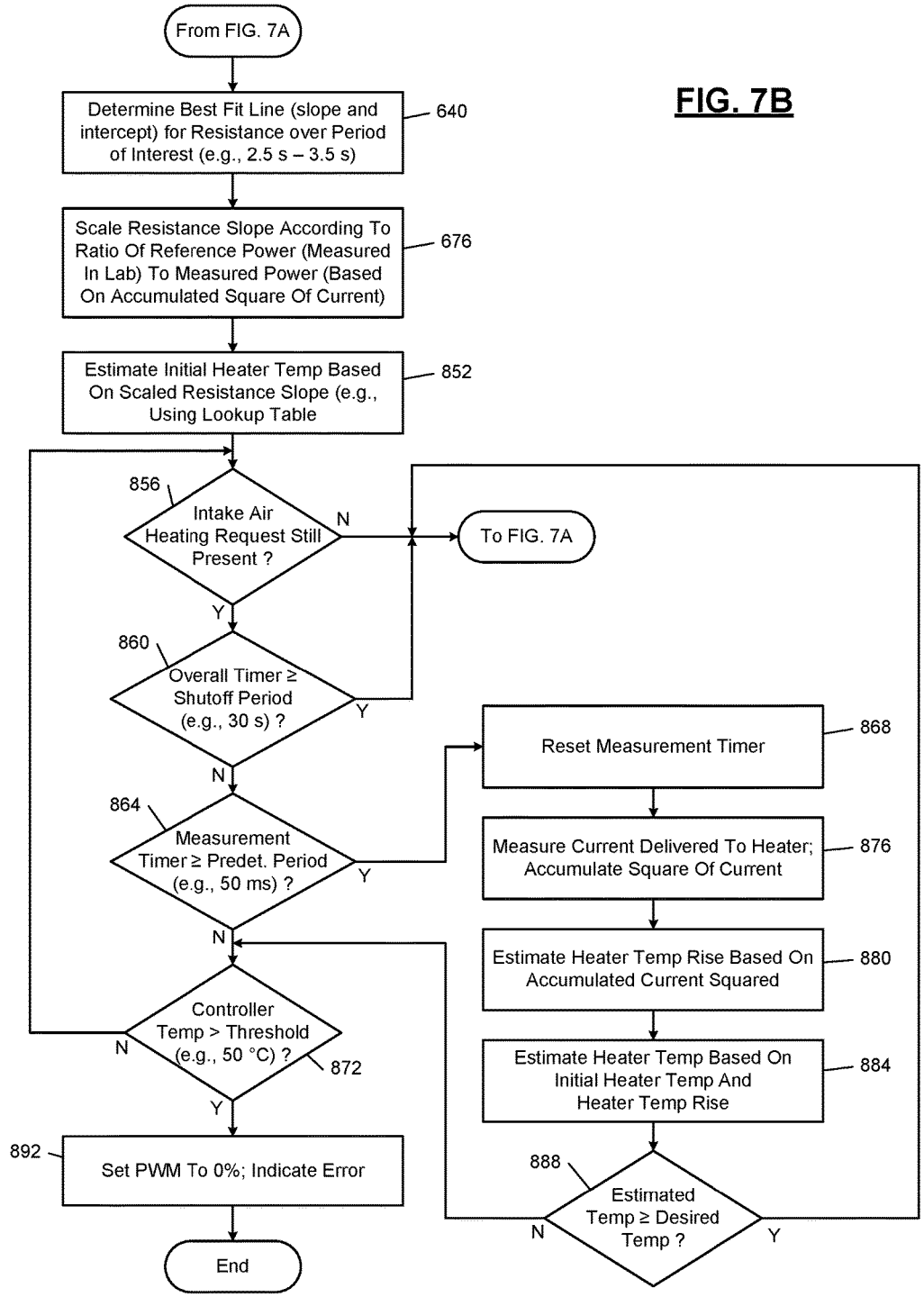

In FIGS. 7A-7B, a flowchart depicts heater control similar to that of FIGS. 6A-6B. In the method described in FIGS. 6A-6B, errors in estimating the connection resistance may lead to errors in estimating the heater temperature. For example, errors in estimating the connection resistance, and shifts between measurement ground and heater ground, may result in estimation errors of up to 100 degrees Celsius or 150 degrees Celsius. The purpose of estimating the connection resistance is to minimize the measurement error associated with measuring the voltage across the heater element when the ground of the heater element is shifted (by the voltage drop across the non-zero connection resistance) from the ground of the measurement circuit.

If a certain heater temperature is desired, but measurement errors may result in the estimated temperature being higher than actual, the desired temperature may not actually be achieved when the estimated temperature reaches the desired temperature. To guarantee the desired temperature is actually reached, the heater may be driven until the estimated temperature reaches the desired temperature plus a safety margin. This may lengthen the amount of time necessary to be guaranteed to achieve the desired temperature, which may not meet customer requirements for how quickly the heater should come up to temperature. The target temperature of the heater may be established by the engine manufacturer based on starting parameters of the engine and emissions targets.

The method described in FIGS. 7A-7B relies on accumulating the square of current delivered to the heater without relying so heavily on voltage measurements, which can be affected by, among other factors, ground shifts. Reference numerals in FIGS. 7A-7B that correspond to reference numerals of FIGS. 6A-6B indicate similar operation.

In FIG. 7A, control begins similarly to that of FIG. 6A. In some implementations, voltage measurements may be completely eliminated, meaning that blocks 604, 612, 616, 644, 648, and 652 could be omitted in comparison with FIG. 6A. Further, block 608 would be modified to remove starting the voltage timer.

In FIG. 7B, blocks 640 and 676 are similar to those of FIG. 6B. After 676, control continues at 852, where the initial heater temperature (that is, at the time the intake air heating request was received and control transferred to 604 in FIG. 7A) is estimated. The initial heater temperature is estimated based on the scaled resistance slope calculated in 676. A table as shown above may be used to look up the initial heater temperature based on the scaled resistance slope. In other implementations, an expression that is a function of scaled resistance slope may be evaluated to estimate initial heater temperature.

At 856, control determines whether the intake air heating request is still present. If so, control transfers to 860; otherwise, control returns to FIG. 7A, where the heater is turned off by driving the heater with a 0% duty cycle. At 860, if the overall timer has exceeded a shutoff period, such as 30 seconds, control returns to FIG. 7A; otherwise, control continues at 864. At 864, if the measurement timer has reached a predetermined period, such as 50 milliseconds, control transfers to 868; otherwise, control transfers to 872.

At 868, the measurement timer is reset. At 876, control measures the current delivered to the heater. This measurement may be a single current measurement or may represent an average of current measured over a period of time since the last measurement interval. The square of the measured current is calculated and added to the accumulated current squared. At 880, the heater temperature rise is estimated based on the accumulated square of the current. For example, a linear or polynomial expression with predefined coefficients may be used to calculate the heater temperature increase as a function of the accumulated square of the current.

At 884, the heater temperature is estimated by adding the temperature increase to the initial heater temperature. At 888, control determines whether the estimated temperature is greater than or equal to the target temperature. If so, control transfers to FIG. 7A; otherwise, control continues at 872. This turns off the heater once the desired temperature has been reached. In implementations where the engine may not be started immediately upon achieving the desired temperature, closed-loop control may be performed to maintain the temperature.

For example, instead of transferring directly to FIG. 7A, control may measure a reference heater resistance, which corresponds to the current heater temperature, which control believes to be the desired temperature. Control can then perform closed-loop control on the PWM duty cycle to minimize the difference between the reference heater resistance and a measured heater resistance updated periodically (such as every 50 milliseconds). While performing closed-loop control, the shutoff period check (860), controller temp check (872), and air heating request presence check (852) would still be performed. With closed-loop control, the temperature of the heater can be approximately maintained as heat is dissipated into the surrounding air, which will be much colder than the heater.

Control at 888 may be performed in the domain of the accumulated current squared instead of requiring a conversion to estimated temperature. For example, 884 may be eliminated and 852 may be supplemented by determining a target accumulated current squared value to reach. Then, block 888 simply compares the accumulated current squared value to the target value. Once the target value is reached, a sufficient amount of current has been delivered to the heater to cause the heater to reach the desired temperature.

At 872, if the temperature of the controller circuitry or housing is greater than a threshold, such as 50 degrees Celsius, control continues at 892; otherwise, controller turns to 856. The controller temperature may be measured using a thermistor. At 892, the heater is disabled by setting the duty cycle to 0% and an error is indicated. Control then ends.

Figure 8:
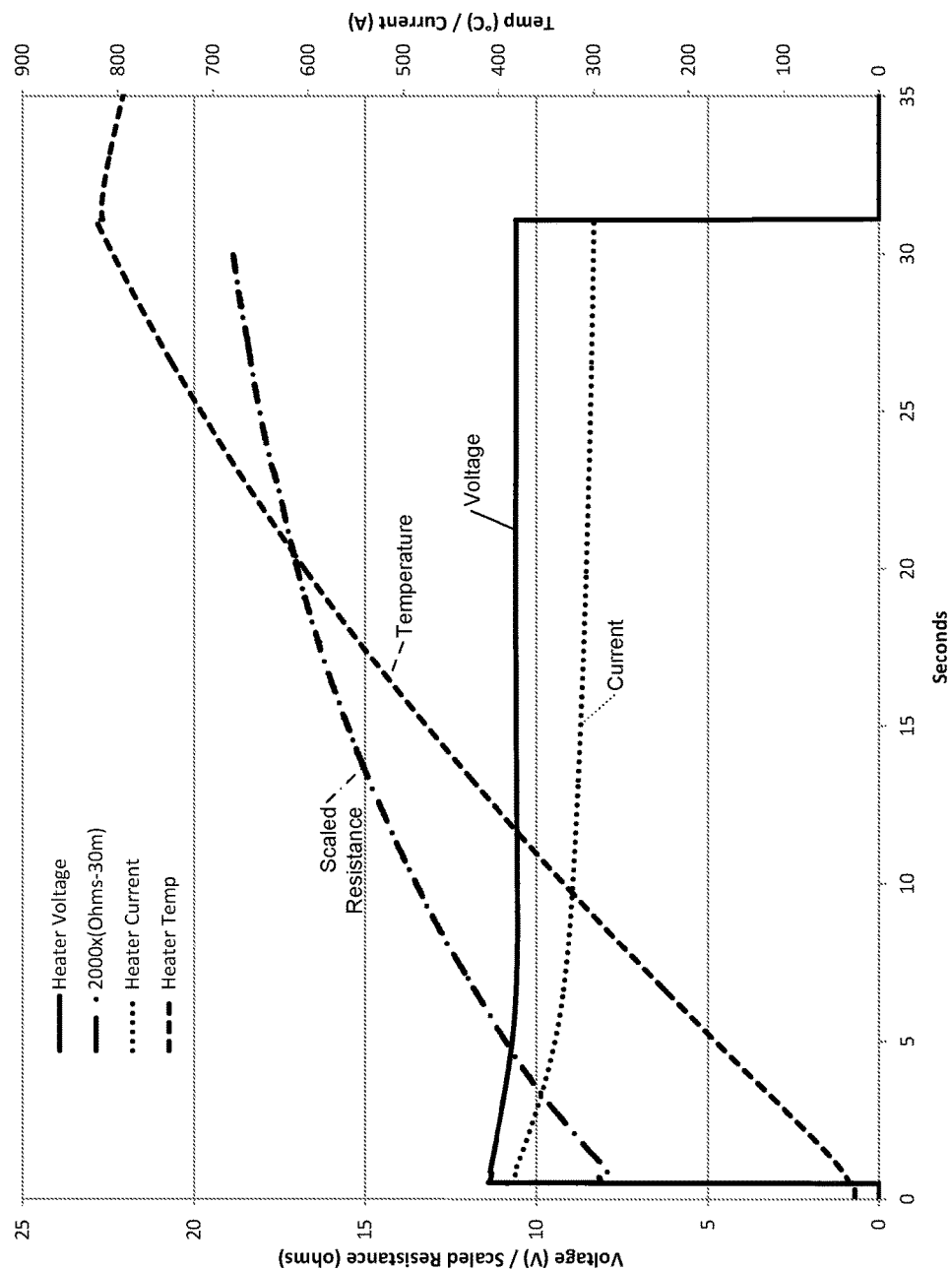
FIG. 8 is an example time plot demonstrating heater resistivity changes based on temperature.

In FIG. 8, a plot shows heater voltage, heater amperage, heater element temperature, and heater resistance (as measured at the battery) over a 35-second startup. The axis on the right (from 0 to 900) indicates both element temperature in degrees Celsius as well as current in amps. The axis on the left (from 0 to 25) indicates voltage in volts as well as a scaled and shifted value of the resistance in the Ohms. To fit the resistance of the heater as measured at the battery on the same scale as voltage, 30 milliohms were subtracted from the measured resistance and the result was multiplied by 2000. In this particular test, the connection resistance was approximately 4 milliohms, which may be higher than in practical implementations.

Figure 9:
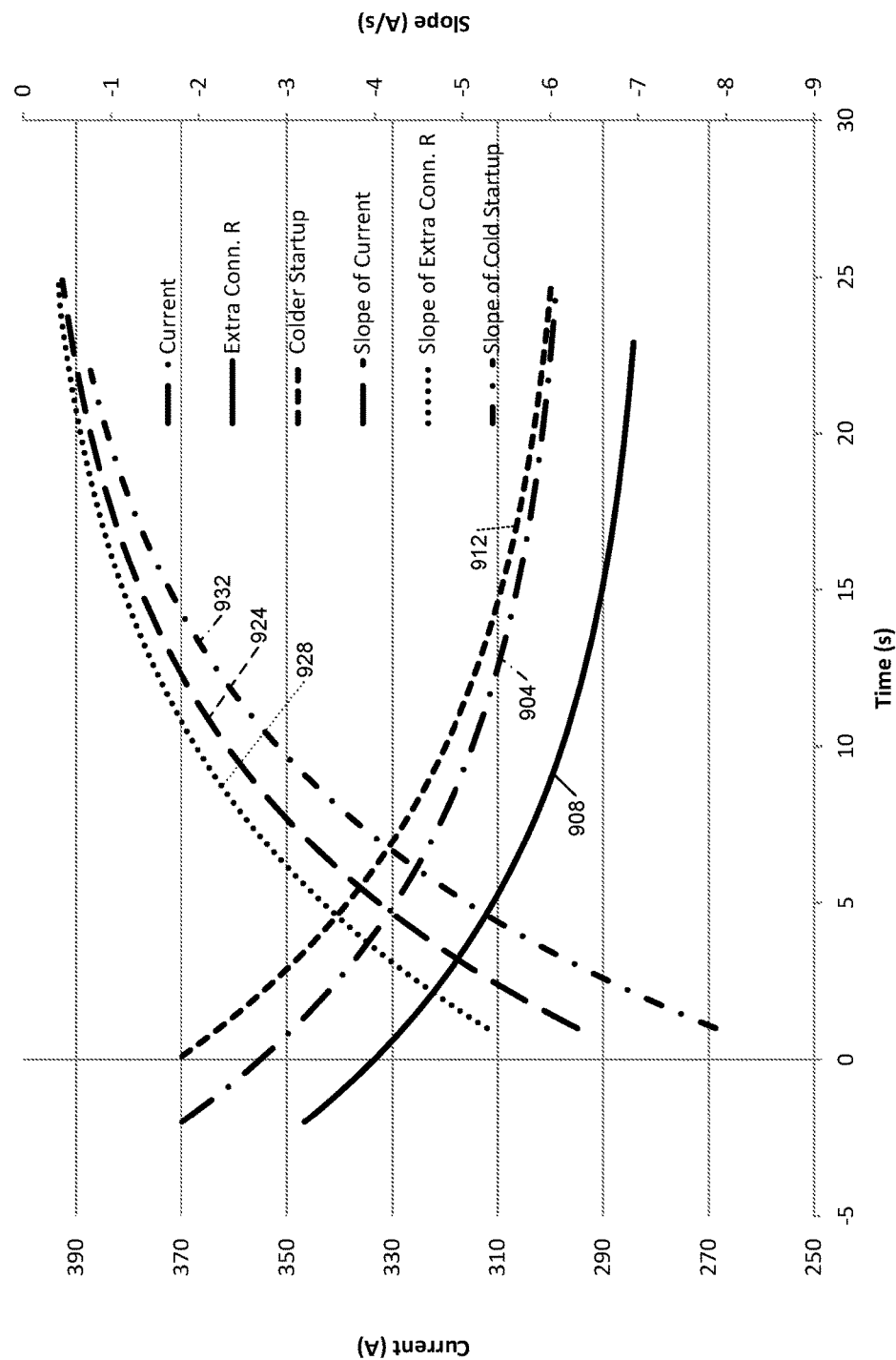
FIG. 9 is a time plot of example current and current derivative traces for an intake air heater in various conditions.

In FIG. 9, plotted functions of current over time as well as the derivatives of the current functions are plotted. The right-hand axis (from −9 to 0) corresponds to the slope of the current in amps per second. The resistance can be calculated from the amperage curves since the voltage is at 11.0 V.

A first current trace 904 corresponds to a standard interconnect resistance at a reference temperature (such as 20° C.) as used in laboratory measurements. A second current trace 908 corresponds to an increased interconnect resistance. A third current trace 912 corresponds to a lower temperature startup. Mathematical derivative traces 924, 928, and 932 correspond to current traces 904, 908, and 912, respectively.

While the pictured current slopes are negative, the corresponding resistance slopes (as measured by the control circuit) are positive, as Ohm's law relates them inversely. Without looking at slope, more interconnect resistance looks the same as a hotter starting coil temperature. Because the rate of change of resistance slows as the coil heats up, the slope of a coil starting at a very low temperature is lower than one that started at a higher temperature. The slope can therefore differentiate between how much of the observed resistance was interconnect resistance and how much was heat-related resistance increase in the heater coil.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An intake air heating system for a vehicle, the system comprising:
    an electrical switching device configured to selectively connect a battery of the vehicle to a heater coil in contact with intake air of the vehicle; and
    a control circuit configured to
        in response to an enable signal from an engine controller, drive the electrical switching device to connect the battery to the heater coil at full current;
        measure a resistance of the heater coil indicative of an initial temperature of the heater coil;
        estimate a temperature increase by:
            repeatedly measuring a current value of current through the electrical switching device;
            calculating a statistical value of the measured current values based on a sum of squared values of the measured current values; and
            determining the temperature increase based on the statistical value;
        estimate a temperature of the heater coil based on a sum of the initial temperature of the heater coil and the temperature increase; and
        in response to the estimated temperature of the heater coil exceeding a desired temperature value, modulate the electrical switching device to reduce current from the battery of the vehicle to the heater coil.

2. The system of claim 1 wherein the control circuit is configured to estimate the temperature increase based on a lookup table of temperature increases indexed by statistical values.

3. The system of claim 1 wherein the control circuit is configured to estimate the initial temperature of the heater coil based on a rate of rise of the resistance of the heater coil over a period of interest.

4. The system of claim 3 wherein the control circuit is configured to, prior to estimating the initial temperature of the heater coil, scale the rate of rise by a ratio of (i) a reference statistical value to (ii) the statistical value.

5. The system of claim 1 wherein the control circuit is configured to measure the resistance of the heater coil by:
    measuring a present value of current through the electrical switching device and a voltage value at a terminal of the electrical switching device; and
    calculating the resistance of the heater coil based on a ratio of the measured voltage value to the measured current value.

6. The system of claim 5 wherein the control circuit is configured to:
    measure a reference voltage at the terminal of the electrical switching device while the electrical switching device is off; and
    subtract the reference voltage from the measured voltage value prior to calculating the resistance of the heater coil.

7. The system of claim 1 wherein the electrical switching device comprises a plurality of transistors connected in parallel.

8. The system of claim 1 wherein the control circuit is configured to drive the electrical switching device using pulse-width modulation.

9. The system of claim 1 further comprising:
    a metal enclosure housing the electrical switching device and the control circuit,
    wherein the electrical switching device is thermally coupled to the metal enclosure, which absorbs heat from the electrical switching device.

10. The system of claim 9 further comprising:
a temperature sensor configured to measure a temperature of at least one of the control circuit, the electrical switching device, and the metal enclosure,
wherein the control circuit is configured to turn off the electrical switching device in response to the measured temperature exceeding a temperature threshold.

11. The system of claim 1 further comprising a transceiver configured to (i) receive the desired temperature value from the engine controller over a communications bus and (ii) provide the desired temperature value to the control circuit.

12. The system of claim 11 wherein the transceiver is configured to:
command the control circuit to enter a low-power mode in response to inactivity on the communications bus for more than a predetermined period of time; and
command the control circuit to enter an operating mode in response to receiving a predetermined signal on the communications bus,
wherein the control circuit consumes less power when in the low-power mode than when in the operating mode.

13. The system of claim 1 wherein:
the battery is characterized by an internal resistance; and
the control circuit is configured to:
measure a first voltage of the battery while the battery is disconnected from the heater coil by the electrical switching device;
once the electrical switching device connects the heater coil to the battery, measure a second voltage of the battery and measure a current through the electrical switching device; and
determine the internal resistance based on the first voltage, the second voltage, and the current.

14. A method of operating an intake air heating system for a vehicle, the method comprising:
in response to an enable signal from an engine controller, driving an electrical switching device to connect a battery to a heater coil at full current;
measuring a resistance of the heater coil indicative of an initial temperature of the heater coil;
estimating a temperature increase, including:
repeatedly measuring a current value of current through the electrical switching device;
calculating a statistical value of the measured current values based on a sum of squared values of the measured current values; and
determining the temperature increase based on the statistical value;
estimating a temperature of the heater coil based on a sum of the initial temperature of the heater coil and the temperature increase; and
in response to the temperature of the heater coil exceeding a desired temperature value, modulating the electrical switching device to reduce current from the battery of the vehicle to the heater coil.

15. The method of claim 14 further comprising estimating the initial temperature of the heater coil based on a rate of rise of the resistance of the heater coil over a period of interest.

16. The method of claim 15 further comprising, prior to estimating the initial temperature of the heater coil, scaling the rate of rise by a ratio of (i) a reference statistical value to (ii) the statistical value.

17. The method of claim 14 wherein determining the temperature increase includes using the statistical value to index a lookup table of temperature increases.

\* \* \* \* \*